US009264126B2

(12) United States Patent
Foster et al.

(10) Patent No.: US 9,264,126 B2
(45) Date of Patent: Feb. 16, 2016

(54) METHOD TO ESTABLISH AND MAINTAIN AN AIRCRAFT AD-HOC COMMUNICATION NETWORK

(75) Inventors: Eric N. Foster, New Freedom, PA (US); Donald C. Kauffman, Laurel, MD (US)

(73) Assignee: Honeywell International Inc., Morris Plains, NJ (US)

( * ) Notice: Subject to any disclaimer, the term of this patent is extended or adjusted under 35 U.S.C. 154(b) by 887 days.

(21) Appl. No.: 11/875,660

(22) Filed: Oct. 19, 2007

(65) Prior Publication Data
US 2009/0103473 A1    Apr. 23, 2009

(51) Int. Cl.
*H04B 7/185* (2006.01)

(52) U.S. Cl.
CPC ........ *H04B 7/18506* (2013.01); *H04B 7/18584* (2013.01)

(58) Field of Classification Search
CPC ........ H04B 7/00; H04B 7/14; H04B 7/18502; H04B 7/18504; H04B 7/18506; H04B 7/18584; H04L 45/00; H04L 45/02; H04L 45/74
USPC .................. 370/310, 351, 316, 315
See application file for complete search history.

(56) References Cited

U.S. PATENT DOCUMENTS

| 4,414,661 | A |   | 11/1983 | Karlstrom |
| 4,901,307 | A |   | 2/1990 | Gilhousen et al. |
| 5,095,480 | A |   | 3/1992 | Fenner |
| 5,530,909 | A |   | 6/1996 | Simon et al. |
| 5,835,059 | A |   | 11/1998 | Nadel et al. |
| 6,018,659 | A |   | 1/2000 | Ayyagari |
| 6,047,165 | A |   | 4/2000 | Wright et al. |
| 6,064,335 | A | * | 5/2000 | Eschenbach ............. 342/357.31 |

(Continued)

FOREIGN PATENT DOCUMENTS

| EP | 967815 | 12/1999 |
| EP | 1793512 | 6/2007 |

(Continued)

OTHER PUBLICATIONS

"The ATN SARPs Third Edition", "Manual of Technical Provisions for the Aeronautical Telecommunications Network—ICAO DOC 9705/AN956", Publisher: ATN.

(Continued)

*Primary Examiner* — Anh Ngoc Nguyen
(74) *Attorney, Agent, or Firm* — Fogg & Powers LLC

(57) ABSTRACT

An ad-hoc communication network including at least two vehicles such as at least two aircraft. Each vehicle includes surveillance equipment, a surveillance transmitter, a surveillance receiver, a communication management function (CMF), a communication transmitter, and a communication receiver. The surveillance equipment is configured to generate at least position and ID information. The surveillance transmitter is configured to transmit the at least position and ID information. The surveillance receiver is configured to receive at least position and ID information from other vehicles. The communication management function (CMF) is configured to determine a network topology based on the received at least position and ID information and determine a route for a communication signal based on the determined network topology and the communication transmitter is configured to transmit the communication signals to a select communication receiver pursuant to the determined route.

18 Claims, 3 Drawing Sheets

(56) References Cited

U.S. PATENT DOCUMENTS

| | | |
|---|---|---|
| 6,084,870 A | 7/2000 | Wooten |
| 6,104,712 A | 8/2000 | Robert et al. |
| 6,108,539 A | 8/2000 | Ray et al. |
| 6,147,980 A | 11/2000 | Yee et al. |
| 6,148,179 A | 11/2000 | Wright et al. |
| 6,154,636 A | 11/2000 | Wright et al. |
| 6,160,998 A | 12/2000 | Wright et al. |
| 6,163,681 A | 12/2000 | Wright et al. |
| 6,173,230 B1 | 1/2001 | Camus et al. |
| 6,181,990 B1 | 1/2001 | Grabowsky et al. |
| 6,195,189 B1 | 2/2001 | Nishihata et al. |
| 6,259,379 B1 | 7/2001 | Paterson et al. |
| 6,271,768 B1 * | 8/2001 | Frazier et al. ............... 340/961 |
| 6,285,878 B1 | 9/2001 | Lai |
| 6,308,044 B1 | 10/2001 | Wright et al. |
| 6,438,468 B1 | 8/2002 | Muxlow et al. |
| 6,477,152 B1 | 11/2002 | Hiett |
| 6,606,055 B2 | 8/2003 | Halsema et al. |
| 6,643,274 B2 | 11/2003 | D'Annunzio |
| 6,677,888 B2 | 1/2004 | Roy |
| 6,744,396 B2 | 6/2004 | Stone et al. |
| 6,778,825 B2 | 8/2004 | Parkman |
| 6,788,935 B1 | 9/2004 | McKenna et al. |
| 6,795,408 B1 | 9/2004 | Hiett |
| 6,810,527 B1 | 10/2004 | Conrad et al. |
| 6,816,728 B2 | 11/2004 | Igloi et al. |
| 6,819,670 B1 | 11/2004 | Fenner |
| 6,915,189 B2 | 7/2005 | Igloi et al. |
| 6,925,088 B1 | 8/2005 | Moreaux |
| 6,931,248 B2 | 8/2005 | Borel |
| 6,940,832 B2 | 9/2005 | Saadawi et al. |
| 6,965,816 B2 | 11/2005 | Walker |
| 6,970,444 B2 | 11/2005 | Chwieseni et al. |
| 6,990,319 B2 | 1/2006 | Wright et al. |
| 7,027,812 B2 | 4/2006 | Dastrup et al. |
| 7,072,977 B1 | 7/2006 | Bernard et al. |
| 7,085,290 B2 | 8/2006 | Cain |
| 7,085,562 B1 | 8/2006 | Holder et al. |
| 7,116,266 B1 | 10/2006 | Vesel et al. |
| 7,177,295 B1 | 2/2007 | Sholander et al. |
| 7,177,939 B2 | 2/2007 | Nelson et al. |
| 7,187,927 B1 | 3/2007 | Mitchell |
| 7,343,157 B1 | 3/2008 | Mitchell |
| 7,454,203 B2 | 11/2008 | Levitan |
| 7,519,014 B2 | 4/2009 | Allen et al. |
| 7,522,628 B1 | 4/2009 | Elliott |
| 7,599,314 B2 | 10/2009 | Wittenschlaeger |
| 7,633,873 B1 | 12/2009 | Kohler |
| 7,643,426 B1 | 1/2010 | Lee |
| 7,729,263 B2 | 6/2010 | True et al. |
| 7,756,508 B1 | 7/2010 | Usher et al. |
| 7,769,028 B2 | 8/2010 | Boley et al. |
| 7,814,322 B2 | 10/2010 | Gurevich et al. |
| 7,848,278 B2 | 12/2010 | Chen et al. |
| 7,876,736 B2 | 1/2011 | Inoue |
| 7,907,893 B2 | 3/2011 | Karabinis et al. |
| 7,924,761 B1 | 4/2011 | Stevens |
| 7,940,669 B2 | 5/2011 | Vaswani et al. |
| 8,023,936 B2 | 9/2011 | Hudson et al. |
| 8,190,147 B2 | 5/2012 | Kauffman et al. |
| 8,284,674 B2 | 10/2012 | True et al. |
| 8,570,990 B2 | 10/2013 | Kauffman |
| 8,577,369 B2 | 11/2013 | Achtari et al. |
| 8,811,265 B2 | 8/2014 | Horvath |
| 8,929,830 B2 | 1/2015 | Ludwig et al. |
| 2002/0009993 A1 | 1/2002 | Dastrup et al. |
| 2002/0168971 A1 | 11/2002 | Parkman |
| 2002/0191573 A1 | 12/2002 | Whitehill et al. |
| 2003/0003872 A1 | 1/2003 | Brinkley et al. |
| 2003/0030581 A1 | 2/2003 | Roy |
| 2003/0053424 A1 | 3/2003 | Krishnamurthy et al. |
| 2003/0071743 A1 | 4/2003 | Seah et al. |
| 2003/0072252 A1 | 4/2003 | Gurney |
| 2003/0073406 A1 | 4/2003 | Benjamin |
| 2003/0158963 A1 | 8/2003 | Sturdy |
| 2003/0231574 A1 | 12/2003 | Okuda et al. |
| 2004/0008253 A1 | 1/2004 | Monroe |
| 2004/0028003 A1 | 2/2004 | Diener et al. |
| 2004/0132495 A1 | 7/2004 | Horton, Jr. et al. |
| 2004/0157557 A1 | 8/2004 | Barnett et al. |
| 2004/0235469 A1 | 11/2004 | Krug |
| 2005/0026609 A1 | 2/2005 | Brinkley et al. |
| 2005/0053026 A1 | 3/2005 | Mullan et al. |
| 2005/0054346 A1 | 3/2005 | Windham et al. |
| 2005/0064895 A1 | 3/2005 | Oesterling et al. |
| 2005/0090201 A1 * | 4/2005 | Lengies et al. ............... 455/41.2 |
| 2005/0108374 A1 | 5/2005 | Pierzga et al. |
| 2005/0143013 A1 | 6/2005 | Jha |
| 2005/0174950 A1 | 8/2005 | Ayyagari |
| 2005/0197748 A1 | 9/2005 | Holst et al. |
| 2005/0220055 A1 | 10/2005 | Nelson et al. |
| 2005/0221814 A1 | 10/2005 | Fagan et al. |
| 2005/0221818 A1 | 10/2005 | Johnson et al. |
| 2005/0232185 A1 | 10/2005 | Hudson et al. |
| 2005/0234788 A1 | 10/2005 | Hudson et al. |
| 2005/0281270 A1 | 12/2005 | Kossi |
| 2005/0286452 A1 | 12/2005 | Hardgrave et al. |
| 2006/0023677 A1 | 2/2006 | Labrador et al. |
| 2006/0031394 A1 | 2/2006 | Tazuma |
| 2006/0080451 A1 | 4/2006 | Eckert |
| 2006/0098608 A1 | 5/2006 | Joshi |
| 2006/0167618 A1 | 7/2006 | Werback |
| 2006/0176842 A1 | 8/2006 | Tamura |
| 2006/0178141 A1 | 8/2006 | McGuffin et al. |
| 2006/0183474 A1 | 8/2006 | Ziarno et al. |
| 2006/0205345 A1 | 9/2006 | Ishikawa |
| 2006/0270447 A1 | 11/2006 | Everson et al. |
| 2007/0026866 A1 | 2/2007 | Krishnamurthi et al. |
| 2007/0042773 A1 | 2/2007 | Alcorn |
| 2007/0042774 A1 | 2/2007 | Alcorn |
| 2007/0072590 A1 | 3/2007 | Levitan |
| 2007/0150939 A1 | 6/2007 | Aaron |
| 2007/0183435 A1 | 8/2007 | Kettering et al. |
| 2007/0198142 A1 * | 8/2007 | Werback ........................ 701/3 |
| 2007/0200761 A1 | 8/2007 | Smith |
| 2007/0213009 A1 | 9/2007 | Higashida et al. |
| 2007/0284474 A1 | 12/2007 | Olson et al. |
| 2007/0286097 A1 | 12/2007 | Davies |
| 2007/0297416 A1 | 12/2007 | Boley |
| 2008/0095134 A1 | 4/2008 | Chen et al. |
| 2008/0117858 A1 | 5/2008 | Kauffman |
| 2008/0144617 A1 | 6/2008 | Molsberry et al. |
| 2008/0150784 A1 * | 6/2008 | Zhang et al. .................. 342/30 |
| 2008/0151811 A1 | 6/2008 | El-Damhougy et al. |
| 2008/0186897 A1 | 8/2008 | Rune |
| 2008/0186907 A1 | 8/2008 | Yagyuu et al. |
| 2008/0205283 A1 | 8/2008 | McGuffin et al. |
| 2008/0240038 A1 | 10/2008 | Lynche et al. |
| 2008/0240062 A1 | 10/2008 | Lynch et al. |
| 2008/0274734 A1 | 11/2008 | Kostanic et al. |
| 2008/0291843 A1 | 11/2008 | Sonnenberg et al. |
| 2009/0005041 A1 | 1/2009 | Steinberg |
| 2009/0041041 A1 | 2/2009 | True et al. |
| 2009/0058682 A1 | 3/2009 | True |
| 2009/0077626 A1 | 3/2009 | Leclercq et al. |
| 2009/0092074 A1 | 4/2009 | Jamalipour |
| 2009/0103452 A1 | 4/2009 | Horvath |
| 2009/0103473 A1 | 4/2009 | Foster |
| 2009/0141669 A1 | 6/2009 | Kauffman |
| 2009/0197595 A1 | 8/2009 | Kauffman et al. |
| 2009/0318137 A1 | 12/2009 | Kauffman et al. |
| 2009/0318138 A1 | 12/2009 | Zeng et al. |
| 2010/0057899 A1 | 3/2010 | Henkel |
| 2010/0157905 A1 | 6/2010 | Ahn et al. |
| 2010/0272012 A1 | 10/2010 | Knefelkamp |

FOREIGN PATENT DOCUMENTS

| | | |
|---|---|---|
| EP | 1926234 | 5/2008 |
| WO | 2005069545 | 7/2005 |
| WO | 2007022353 | 2/2007 |
| WO | 2007043827 | 4/2007 |

(56) References Cited

FOREIGN PATENT DOCUMENTS

| WO | 2007054410 | 5/2007 |
|---|---|---|
| WO | 2007059560 | 5/2007 |
| WO | 2008007861 | 1/2008 |

OTHER PUBLICATIONS

Avionica, "Securelink", , pp. 12, Publisher: Avionica.
Carlos Jodar et al., "Wi-Fi Gatelink Trial Frankfurt and Muich, Germany White Paper", Aug. 9, 2006, pp. 1-18, Publisher: Arinc Proprietary.
Eklund et al., "IEEE Standard 802.16: A Technical Overview of the Wirelessman Air Interface for Broadband Wireless Access", "IEEE Communications Magazine", Jun. 2002, pp. i-107, Publisher: IEEE.
Hardy et al., "Aircraft Network and File Server—Arinc 763", Oct. 16, 2002, pp. 1-12, Publisher: AEEC (Airlines Electronic Engineering Committee).
"Technical Overview for Mark III Communications Management Unit (CMU)", , pp. 1-59, Publisher: Honeywell Aerospace Electronic Systems.
Hurlburt et al., "A Data Communications Concept for a SATS Scenario", "4th Integrated CNS Technologies Conference and Workshop", Apr. 2004, pp. 1-20.
Ivancic, "Modular, Cost-Effective, Extensible Avionics Architecture for Secure Mobile Communications", "2006 IEEE Aerospace Conference—March 4-11, 2006 Big Sky, Montana", 2006, pp. 1-9, Publisher: IEEE.
Teledyne Technologies Inc., "Wireless Groundlink System (WGL)", "www.teledyne-controls.com/productsolution.wirelessgroundlink.groundlink.asp", 2007, pp. 1-2, Publisher: Teledyne Technologies Inc.
Teledyne Technologies Inc., "New Release", "www.teledyne-controls.com/newscenter/sco.asp", 2007, pp. 1-2, Publisher: Teledyne Technologies Inc.
Polajnar et al., "Simple and Efficient Protocols for Guaranteed Message Delivery in Wireless Ad-hoc Networks", "Wireless and Mobile Computing, Networking and Communications 2005", Aug. 22, 2005, pp. 93-100, vol. 3, Publisher: IEEE, Published in: Piscataway, NJ.
Sakhaee et al., "Aeronautical ad hoc Networks", "Wireless Communications and Networking Conference", Jan. 1, 2006, pp. 246-251, Publisher: IEEE, Published in: Piscataway, NJ.
Zhou et al., "GeoLANMAR: Geo Assisted Landmark Routing for Scalable, Group Motion Wireless Ad Hoc Networks", "Vehicular Technology Conference 2005", May 30, 2005, pp. 2420-2424, vol. 4, Publisher: IEEE, Published in: Piscataway, NJ.
Mouza et al., "Mobility Patterns", "Proceedings of the Second Workshop on Spatio-Temporal Database Management", Jul. 23, 2004, Published in: Toronto, Canada.
Samal, "Mobility Pattern Aware Routing in Mobile Ad Hoc Network ", May 2003, Publisher: Virginia Polytechnic Institute and State University , Published in: Blacksburg, Virginia.
Vyas et al. , "Location and Mobility Pattern Based Routing Algorithm for Mobile Ad Hoc Wireless Networks", "http://www.scs.org/getDoc.cfm?id=2466", 2003, Publisher: The Society for Modeling and Simulation International.
Cordeiro et al., "IEEE 802.22: An Introduction to the First Wireless Standard Based on Congitive Radios", "Journal of Communications", Apr. 2006, pp. 38-47, vol. 1, No. 1, Publisher: Academy Publisher.
Canadian Intellectual Property Office, "Office Action from CA Application No. 2,641,083 mailed Apr. 15, 2015", from Foreign Counterpart of U.S. Appl. No. 11/875,660, Apr. 15, 2015, pp. 1-3, Published in: CA.
European Patent Office, "Communication under Rule 71(3) from EP Application No. 08166616.6 mailed Mar. 26, 2013", from Foreign Counterpart of U.S. Appl. No. 11/875,660, Mar. 26, 2013, pp. 1-20, Published in: EP.
European Patent Office, "Office Action", from Foreign Counterpart of U.S. Appl. No. 11/875,660, Sep. 13, 2012, pp. 1-3, Published in: EP.
European Patent Office, "European Search Report from EP Application No. 08166616.6 mailed Apr. 10, 2012", from Foreign Counterpart of U.S. Appl. No. 11/875,660, Apr. 10, 2012, pp. 1-3, Published in: EP.
Canadian Patent Office, "Office Action from CA Application No. 2,641,082 mailed Apr. 15, 2015", from Foreign Counterpart of U.S. Appl. No. 11/875,662, Apr. 15, 2015, pp. 1-3, Published in: CA.
European Patent Office, "Communication Under Rule 71(3) from EP Application 08166724.8 mailed Feb. 14, 2013", from Foreign Counterpart of U.S. Appl. No. 11/875,662, Feb. 14, 2013, pp. 1-21, Published in: EP.
U.S. Patent and Trademark Office, "Decision on Appeal", from U.S. Appl. No. 11/875,662, Sep. 19, 2013, pp. 1-7, Published in: US.
U.S. Patent and Trademark Office, "Notice of Allowance", from U.S. Appl. No. 11/875,662, Apr. 15, 2014, pp. 1-16, Published in: US.
U.S. Patent and Trademark Office, "Office Action", from U.S. Appl. No. 11/875,662, Dec. 26, 2013, pp. 1-43, Published in: US.
U.S. Patent and Trademark Office, "Notice of Allowance", U.S. Appl. No. 11/950,218, Jan. 7, 2013, pp. 1-15, Published in: US.
U.S. Patent and Trademark Office, "Office Action", U.S. Appl. No. 11/950,218, Aug. 28, 2012, pp. 1-27, Published in: US.
Canadian Intellectual Property Office, "Office Action from CA Application No. 2,651,435 mailed May 20, 2015", from Foreign Counterpart of U.S. Appl. No. 12/025,685, May 20, 2015, pp. 1-3, Published in: CA.
European Patent Office, "Office Action from EP Application No. 09151372.1 mailed Feb. 3, 2014", from Foreign Counterpart of U.S. Appl. No. 12/025,685, Feb. 3, 2014, pp. 1-4, Published in: EP.
U.S. Patent and Trademark Office, "Final Office Action", from U.S. Appl. No. 12/025,685, May 7, 2013, pp. 1-13, Published in: US.
U.S. Patent and Trademark Office, "Final Office Action", U.S. Appl. No. 12/025,685, Mar. 13, 2015, pp. 1-8, Published in: US.
U.S. Patent and Trademark Office, "Office Action", from U.S. Appl. No. 12/025,685, Aug. 30, 2013, pp. 1-11, Published in: US.
U.S. Patent and Trademark Office, "Office Action", from U.S. Appl. No. 12/025,685, Feb. 19, 2014, pp. 1-15, Published in: US.
U.S. Patent and Trademark Office, "Office Action", U.S. Appl. No. 12/025,685, Aug. 20, 2014, pp. 1-11, Published in: US.
European Patent Office, "Communication Under Rule 71(3) from EP Application No. 09162742.2 mailed Nov. 26, 2012", from Foreign Counterpart of U.S. Appl. No. 12/143,369, Nov. 26, 2012, pp. 1-27, Published in: EP.
U.S. Patent and Trademark Office, "Notice of Allowance", U.S. Appl. No. 12/143,369, Apr. 12, 2012, pp. 1-12, Published in: US.
Drula et al., "Adaptive Energy Conserving Algorithms for Neighbor Discovery in Opportunistic Bluetooth Networks", IEEE Journal on Selected Areas in Communications, Jan. 2007, pp. 96-107, vol. 25, No. 1, Publisher: IEEE.
Canadian Intellectual Property Office, "Office Action from CA Application No. 2,645,527", from Foreign Counterpart of U.S. Appl. No. 11/950,218, Jun. 30, 2015, pp. 1-5, Published in: CA.
U.S. Patent and Trademark Office, "Office Action", U.S. Appl. No. 12/025,685, Aug. 20, 2015, pp. 1-10.

* cited by examiner

METHOD TO ESTABLISH AND MAINTAIN AN AIRCRAFT AD-HOC COMMUNICATION NETWORK

BACKGROUND

In today's aeronautical datalink environment, aircraft datalink service is limited to communication links provided by datalink service providers. Large airlines can spend upwards of $10 million per year on datalink services. Datalink costs could be significantly reduced if aircraft had a means to communicate with the airline operations center without using datalink service providers. Given the large number of aircraft operating at any given time, a feasible approach is to form an ad-hoc network of aircraft where messages are relayed to the final destination. Establishing an ad-hoc network relies on two basic techniques: neighbor discovery and topology discovery. The purpose of neighbor discovery is to determine what nodes are within direct communication range. In mobile ad-hoc networks, neighbor relationships change frequently. Neighbor discovery is typically performed using a hello protocol over the communications network. To account for the continuously changing network topology, nodes broadcast hello messages periodically. Based on received hello messages, each node is able to ascertain its neighbor nodes. Before a routing decision can be made, a node must also determine a complete path to the destination. Topology discovery is performed to determine all the communication paths that are available in the network. During topology discovery, neighbor information is distributed to the entire network using topology control messages. The topology control messages are periodically distributed to the entire network using methods such as message flooding. The broadcast of hello messages and distribution of topology information introduces a significant amount of overhead to the network. Due to the overhead associated with neighbor discovery and topology discovery, establishing ad-hoc network routes and determining that an aircraft (node) in the route is no longer available, can cause considerable overhead in a communications network as well as delays in routing a message, or even result in dropped messages that cannot be delivered.

For the reasons stated above and for other reasons stated below which will become apparent to those skilled in the art upon reading and understanding the present specification, there is a need in the art for an ad-hoc air to air networking communication system that is efficient, reliable and relatively inexpensive to operate.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, an ad-hoc communication network is provided. The network includes at least two vehicles such as at least two aircraft. Each vehicle includes surveillance equipment, a surveillance transmitter, a surveillance receiver, a communication management function (CMF), a communication transmitter, and a communication receiver. The surveillance equipment is configured to generate at least position and ID information. The surveillance transmitter is configured to transmit the at least position and ID information. The surveillance receiver is configured to receive at least position and ID information from other vehicles. The communication management function (CMF) is configured to determine a network topology based on the received at least position and ID information and determine a route for a communication signal based on the determined network topology and the communication transmitter is configured to transmit the communication signals to a select communication receiver pursuant to the determined route.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide an ad-hoc air-to-air communication network that is efficient and reliable by using prior knowledge of the network topology without the need to distribute this information over a communication link. Embodiments use surveillance data that is transmitted between aircraft and also from ground stations to aircraft to obtain the prior knowledge of the network topology. This surveillance data not only provides more reliable awareness of aircraft positions and flight trajectories than by monitoring communications alone, it also avoids the additional overhead of transmitting the position and flight trajectory information over communication links.

Figure 1:
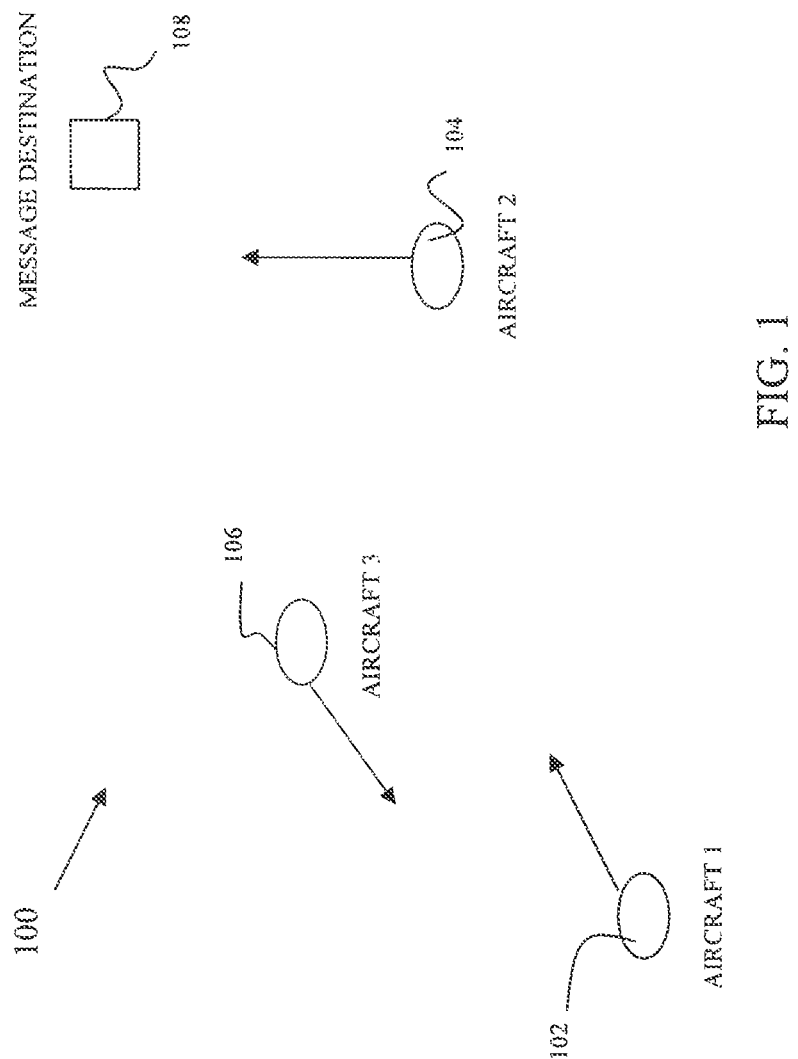
FIG. 1 is an illustration of a communication network of one embodiment of the present invention.

Referring to FIG. 1, an example of a communication network 100 including aircraft 102, 104 and 106 and a ground terminal 108 is illustrated. In this example, an aircraft, such as aircraft 102 desires to communicate a message to message destination 108, but aircraft 102 is beyond communication range with ground terminal 108. Communications between the aircraft are done with very high frequency (VHF) communications that have a relatively short line-of-sight communication range. Hence, aircraft 102 needs to find a communication path between aircraft 106 and 104 for the message to reach ground terminal 108. As discussed above, embodiments use surveillance data from surveillance equipment on the aircraft to discover the network topology of aircraft and ground terminals.

Figure 2:
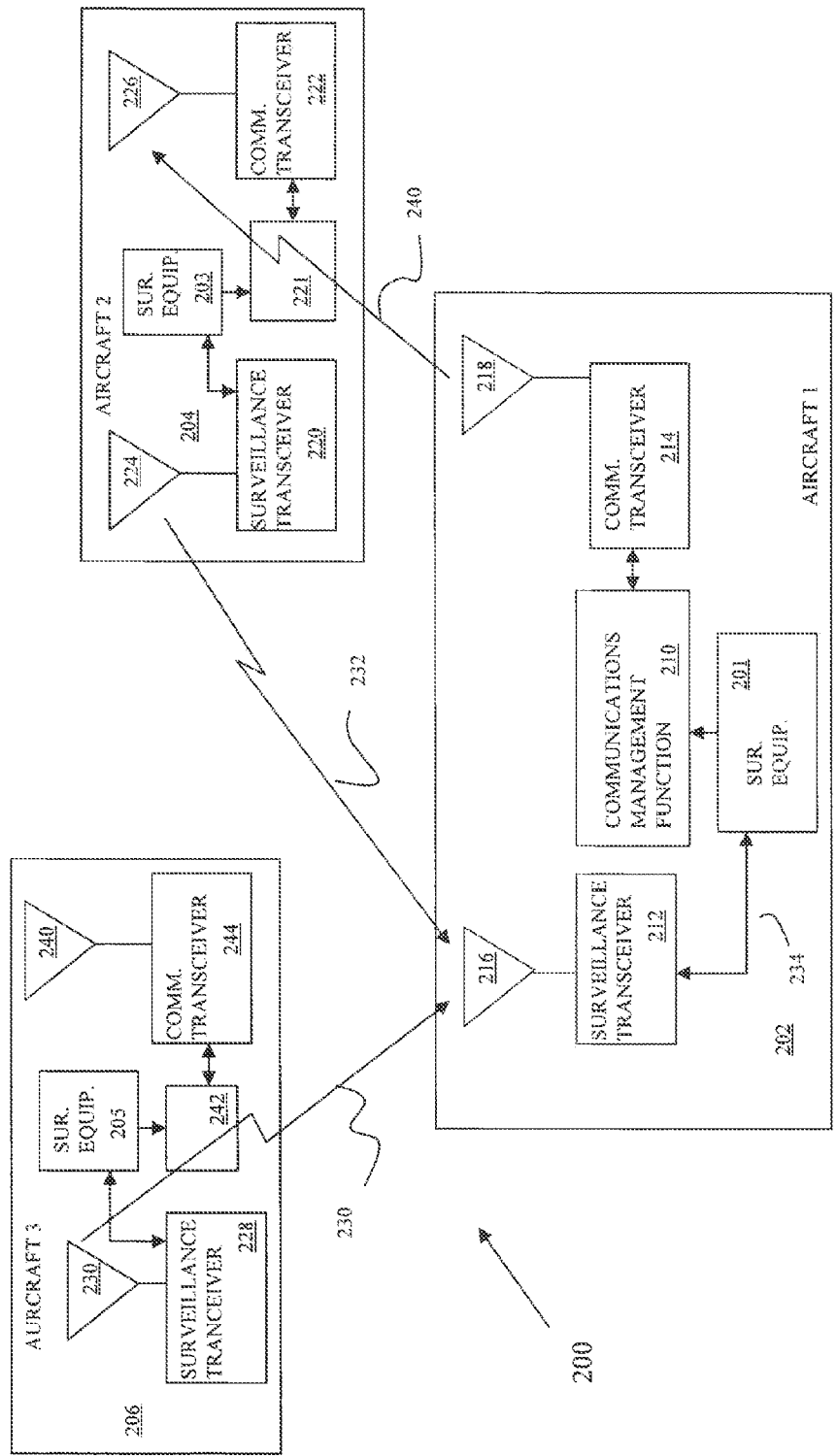
FIG. 2 is a block diagram of aircraft in a communication network of the present invention.

Referring to FIG. 2, block diagrams of a communication network 200 made up of aircraft 202, 204 and 206 is illustrated. It will be understood that the block diagrams only show portions of the aircraft 202, 204 and 206 that are relevant to the current invention. In this example, the first aircraft 202 wants to send a message via the communication network 200. The first aircraft 202 is illustrated has having surveillance equipment 201, a communications management function (CMF) 210, a surveillance transceiver 212, a surveillance antenna 216, a communication transceiver 214 and a communication antenna 218. The second aircraft 204 is also illustrated as having surveillance equipment 203, a CMF 221, surveillance transceiver 220, surveillance antenna 224, communication transceiver 222 and communication antenna 226. Likewise, the third aircraft 206 is illustrated as including surveillance equipment 205, CMF 242, surveillance transceiver 228, surveillance antenna 230, communication transceiver 244 and communication antenna 240. The surveillance equipment 201, 203 and 205 is used by the respective aircraft 202, 204 and 206 to periodically broadcast at least their position and ID to other aircraft and ground systems. An example of a type of surveillance equipment 201 is an Automatic Dependant Surveillance-Broadcast (ADS-B). The primary purpose of the ADS-B is to create traffic situational awareness for both pilots and air traffic controllers. Another example of surveillance equipment is Traffic Conflict and Advisory Systems (TCAS). A TCAS system provides positional data of an aircraft in response to an interrogation by another aircraft with a TCAS interrogator. Yet another example of a planned surveillance system is an Automatic Dependant Surveillance-Rebroadcast (ADS-R). An ADS-R transmits positional and flight intent data to aircraft from multiple sources of data, originating from an airborne surveillance source, ground based surveillance source or both. Embodiments of the present invention use data from the surveillance equipment for topology discovery.

In the communication network 200 example of FIG. 2, the surveillance equipment 205 of the third aircraft 206 provides information such as its ID and its position to the surveillance transmitter 228. Surveillance transmitter 228 sends out a message 230 via surveillance antenna 230 relating to the information. This message is received by the surveillance receiver 212 via surveillance antenna 216 of the first aircraft 202. Also illustrated, is surveillance equipment 203 in the second aircraft 204 that provides at least position and ID information to its surveillance transmitter 220. Surveillance transmitter 220 transmits message 232 that includes the at least position and ID information via surveillance antenna 224 to the surveillance transceiver 212 of the first aircraft 202 via surveillance antenna 216. Hence in this example, the first aircraft 202 has location information from both the second and third aircraft 204 and 206. The CMF 210 of the first aircraft takes the location information 234 from the second and third aircraft 204 and 206 and creates a topology of the communication network 200. The CMF 210 uses the discovered topology to determine where to send its communication signal 240. In the example of FIG. 2, the CMF 210 determined the second aircraft 204 provided the best path for its communication signal 240 based on the discovered topology.

The first aircraft 202 uses its communication transceiver 214 to transmit the communication signal 240 to the second aircraft 204 via communication antenna 218. The second aircraft 204 receives the communication signal 240 via its communication antenna 226 and its transceiver 222. The second aircraft 204 will then discover its network topology like the first aircraft 202 did, to determine where next to send the communication signal on its way to its destination. If the surveillance equipment in the aircraft is capable of providing full topology information (e.g. an ADS-B or ADS-R system where ground systems rebroadcast surveillance data), neighboring nodes (aircraft) and the entire network topology are determined using the surveillance data without the need for exchanging hello messages or topology information. This embodiment avoids all overhead associated with neighbor discovery. If the surveillance system(s) is/are only capable of providing neighbor information (e.g. an ADS-B system limited to exchange in surveillance data with other aircraft within communication range), neighbor nodes are determined using the surveillance data and the entire network topology is determined by exchanging topology information over the communication network. This embodiment avoids only the overhead associated with neighbor discovery. Although, this embodiment is less preferred it still provides a significant overhead reduction.

In reference to the surveillance transceivers 212, 220 and 228 and the communication transceivers 214, 222 and 244, the term "transceiver" is meant as a generic term that describes a combination unit with both transmitter and receiver functionality. However, as one skilled in the art would understand, the invention would work equally well if the transceiver function were physically represented in two separate units, one being a transmitter and the other being a receiver. Hence the present invention is not limited to transceivers.

Figure 3:
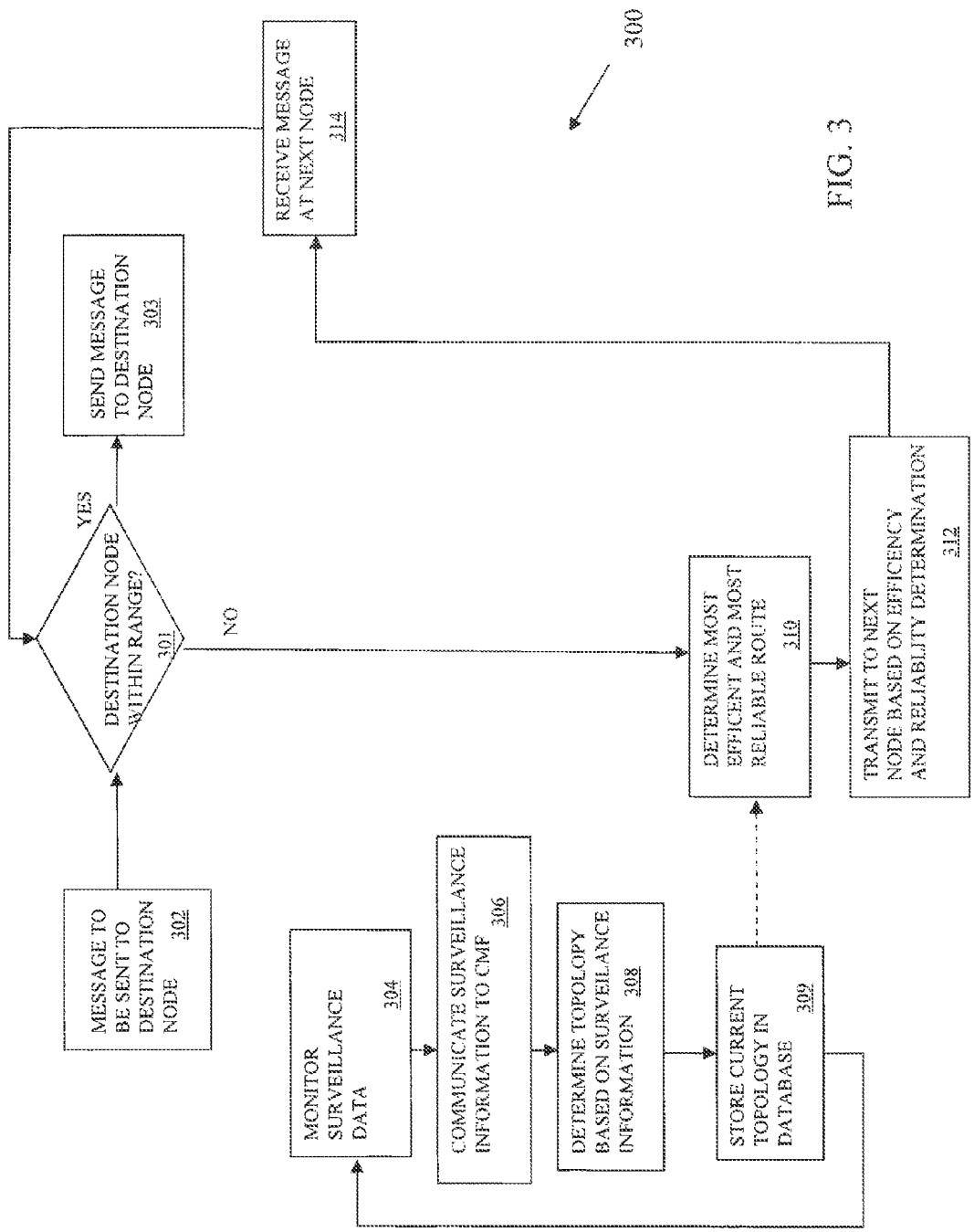
FIG. 3 is a flow diagram of one method of communication in a communication network of one embodiment of the present invention.

FIG. 3 illustrates a communication flow diagram according to one embodiment. In this example of an embodiment, an aircraft has a message to send to a destination node (302). The destination node may be another aircraft, a ground station or the like. It is then determined if the destination node is within radio communication range of the aircraft (301). If the destination node is within communication range, the message is sent to the destination node (303). However, if the destination node is not within the communication range, an ad-hoc communication network is used to deliver the message. The ad-hoc communication network takes advantage of the continuous transmission of surveillance information by aircraft or other sources. As illustrated, in FIG. 3, the originating aircraft monitors surveillance information (304). The surveillance information is communicated to the CMF (306). The current topology of the communication network is determined by the CMF based on the surveillance information (308). Then the current topology is stored in a database (309). This monitoring and storing, as illustrated, is continuously looped through at a select frequency rate. As further illustrated in the communication flow diagram 300 of FIG. 3, when the communication network is needed to deliver a message, the CMF of the node sending the message determines the most efficient and reliable route in the communication network based on the then current stored topology (310). The reliability and longevity of the network route for future message traffic to the same ground destination can be improved further by taking the intended trajectory of the other aircraft into account. This can be accomplished by using position data, aircraft intent data, and properties of the communication link, to predict when existing links will break, when new links will become available, and estimating aircraft-to-aircraft link reliability based on aircraft proximity. For example, if another aircraft is flying on a trajectory towards the ground station, it may be a preferable choice than choosing another aircraft in the same relative position but traveling away from the intended ground station. Choosing the former aircraft would increase the likelihood that the same aircraft could be used for future message traffic between the same two end points. Once the most efficient and most reliable route is determined (310), the communication message is transmitted to the next selected node (312). Once, the communication message is received at the next node (314), the next node determines if it is within communication range of the destination node (301). The process continues until the message is received by the destination node (303).

The methods and techniques used by the CMU as described above in discovering the topology can be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. For example, non-aircraft vehicles employing similar surveillance equipment could implement embodiments of the present invention. This application is intended to cover any such adaptations or variations. Therefore, it is manifestly intended that this invention be limited only by the claims and the equivalents thereof.

The invention claimed is:

1. An ad-hoc aircraft communications network, comprising:
    at least two aircraft vehicles, each of the aircraft vehicles including:
        surveillance equipment configured to generate surveillance information;
        a surveillance transceiver configured to receive surveillance information from other aircraft vehicles;
        a processor for managing communications, the processor configured to:
            (a) receive the surveillance information;
            (b) determine a current ad-hoc network topology based on the surveillance information;
            (c) store the current ad-hoc network topology;
            (d) repeat (a) to (c) at a selected frequency rate; and
            (e) determine a route for communicating a message based on the stored current ad-hoc network topology; and
        a communication transceiver configured to transmit the message to a select node in the ad-hoc aircraft network pursuant to the determined route.

2. A system for communications in an ad-hoc aircraft network, the system comprising:
    a surveillance transceiver located in a first aircraft, the surveillance transceiver configured to receive surveillance information generated by surveillance equipment located in other aircraft;
    a processor located in the first aircraft for managing communications, the processor configured to:
        (a) receive the surveillance information;
        (b) determine a current ad-hoc network topology based on the surveillance information;
        (c) store the current ad-hoc network topology;
        (d) repeat (a) to (c) at a selected frequency rate; and
        (e) determine a route for communicating a message based on the stored current ad-hoc network topology; and
    a communication transceiver located in the first aircraft, the communication transceiver configured to transmit the message to a select node in the ad-hoc aircraft network.

3. A method for communications in an ad-hoc aircraft network, the method comprising:
    (a) monitoring surveillance information from other aircraft, wherein the surveillance information is generated by surveillance equipment located in the other aircraft;
    (b) determining a current ad-hoc network topology based on the surveillance information;
    (c) storing the current ad-hoc network topology;
    (d) repeating steps (a) to (c) at a selected frequency rate;
    (e) determining a route for communicating a message based on the stored current ad-hoc network topology; and
    (f) transmitting the message to a select node in the ad-hoc aircraft network.

4. The network of claim 1, further comprising:
    at least one ground station that includes the select node.

5. The network of claim 1, wherein the surveillance equipment of at least one of the aircraft vehicles is configured to further generate at least one of speed information, heading information and intended trajectory information;
    wherein the surveillance transceiver of at least one other of the aircraft vehicles is configured to receive the at least one of the speed information, heading information and intended trajectory information; and
    wherein the processor of the at least one other of the aircraft vehicles is further configured to determine the network topology based on the received at least one of the speed information, heading information and intended trajectory information.

6. The network of claim 1, further comprising:
    at least one ground station including a ground surveillance source and a ground surveillance transmitter configured to transmit surveillance information to at least one of the aircraft vehicles.

7. The network of claim 1, wherein the surveillance equipment includes at least one of an automatic dependent surveillance-broadcast (ADS-B), and an automatic dependent surveillance-rebroadcast (ADS-R).

8. The network of claim 1, wherein the route determined for communicating the message based on the stored current ad-hoc network topology comprises the most efficient and reliable route.

9. The system of claim 2, wherein the surveillance information includes at least one of position, heading, speed, vehicle ID and intended trajectory information.

10. The system of claim 2, wherein the surveillance equipment includes at least one of an automatic dependent surveillance-broadcast (ADS-B), and an automatic dependent surveillance-rebroadcast (ADS-R).

11. The system of claim 2, wherein the route determined for communicating the message based on the stored current ad-hoc network topology comprises the most efficient and effective route.

12. The method of claim 3, wherein the select node is one of another aircraft and a ground station.

13. The method of claim 3, further comprising:
   determining if the select node is a destination node for the message; and
   if the select node is not the destination node for the message, with the select node:
      monitoring surveillance information from other sources indicating each aircraft's position, heading and speed;
      determining a then current topology of the ad-hoc aircraft network based on the monitored surveillance information; and
      based on the determined then current topology, transmitting the message to another select node in the ad-hoc aircraft network.

14. The method of claim 3, wherein the surveillance equipment includes at least one of an automatic dependent surveillance-broadcast (ADS-B), and an automatic dependent surveillance-rebroadcast (ADS-R).

15. The method of claim 3, wherein the surveillance information includes at least one of position, speed, heading, vehicle ID and intended trajectory information.

16. The method of claim 3, further comprising:
   transmitting surveillance messages from at least one ground station.

17. The method of claim 3, further comprising:
   based on the surveillance information, predicting at least one of when existing communication links will break, when new communication links will become available, and estimating aircraft-to-aircraft communication link reliability based on proximity and flight intent information.

18. The method of claim 17, further comprising:
   determining the most efficient and reliable route for the message based on the prediction.

* * * * *